US008823617B2

(12) United States Patent
Kurosawa

(10) Patent No.: US 8,823,617 B2
(45) Date of Patent: Sep. 2, 2014

(54) LIQUID CRYSTAL DISPLAY APPARATUS AND PROGRAM USED FOR THE SAME

(75) Inventor: Teppei Kurosawa, Utsunomiya (JP)

(73) Assignee: Canon Kabushiki Kaisha (JP)

( * ) Notice: Subject to any disclaimer, the term of this patent is extended or adjusted under 35 U.S.C. 154(b) by 125 days.

(21) Appl. No.: 13/424,469

(22) Filed: Mar. 20, 2012

(65) Prior Publication Data

US 2012/0242717 A1 Sep. 27, 2012

(30) Foreign Application Priority Data

Mar. 24, 2011 (JP) ................................. 2011-065099

(51) Int. Cl.
*G09G 3/36* (2006.01)
*G09G 5/10* (2006.01)
*G09G 3/00* (2006.01)
*H04N 5/20* (2006.01)
*H04N 9/31* (2006.01)

(52) U.S. Cl.
CPC .............. *G09G 3/001* (2013.01); *G09G 3/3611* (2013.01); *H04N 5/20* (2013.01); *H04N 9/3182* (2013.01); *G09G 2360/16* (2013.01)
USPC ........................................... 345/88; 345/690

(58) Field of Classification Search
CPC ........... G09G 3/36; G09G 3/607; G09G 5/10; G09G 5/026
USPC .............................................. 345/88–89, 690
See application file for complete search history.

(56) References Cited

U.S. PATENT DOCUMENTS

| 6,727,872 | B2 | 4/2004 | Pfeiffer et al. |
|---|---|---|---|
| 2003/0156121 | A1 | 8/2003 | Willis |
| 2004/0150654 | A1 | 8/2004 | Willis |
| 2008/0018630 | A1 | 1/2008 | Fujino |
| 2011/0057961 | A1* | 3/2011 | Tsuru et al. .................. 345/690 |

FOREIGN PATENT DOCUMENTS

| EP | 1903544 A1 | 3/2008 |
|---|---|---|
| JP | 2009069608 A | 4/2009 |

OTHER PUBLICATIONS

European Extended Search Report issued in European counterpart application No. EP12001666.2, dated Jun. 26, 2014.

* cited by examiner

*Primary Examiner* — Andrew Sasinowski
(74) *Attorney, Agent, or Firm* — Rossi, Kimms & McDowell LLP

(57) ABSTRACT

A liquid crystal display apparatus includes a feature amount generator configured to generate a feature amount based on the number of pixel pairs that satisfy a correspondence relationship between a gradation value of a target pixel and a gradation value of a surrounding pixel around the target pixel for a image represented by an input image signal, a processor configured to provide processing so as to set a correction value that reduces a dynamic range of a gradation value of the input image signal when the feature amount is larger than a first threshold, and so as not to set the correction value when the feature amount is equal to or smaller than the first threshold, and a liquid crystal driver configured to drive a liquid crystal display element based on the input image signal that has been corrected by the correction value.

7 Claims, 9 Drawing Sheets

| B₁ | B₂ | B₃ |
|----|----|----|
| B₄ | A  | B₅ |
| B₆ | B₇ | B₈ |

FIG. 4A

|  |  | ADJACENT PIXEL LEVEL (8bit) | | | | |
|---|---|---|---|---|---|---|
|  |  | 180<B≦190 | 190<B≦200 | 200<B≦210 | 210<B≦220 | 220<B≦230 |
| TARGET PIXEL LEVEL (8bit) | 210<A≦220 | Nw_11 | Nw_12 | Nw_13 | Nw_14 | Nw_15 |
| | 220<A≦230 | Nw_21 | Nw_22 | Nw_23 | Nw_24 | Nw_25 |
| | 230<A≦240 | Nw_31 | Nw_32 | Nw_33 | Nw_34 | Nw_35 |
| | 240<A≦250 | Nw_41 | Nw_42 | Nw_43 | Nw_44 | Nw_45 |
| | 250<A≦255 | Nw_51 | Nw_52 | Nw_53 | Nw_54 | Nw_55 |

FIG. 4B

|  |  | ADJACENT PIXEL LEVEL (8bit) | | | | |
|---|---|---|---|---|---|---|
|  |  | 0<B≦10 | 10<B≦50 | 50<B≦100 | 100<B≦180 | 180<B≦255 |
| TARGET PIXEL LEVEL (8bit) | 0<A≦1 | Nbk_11 | Nbk_12 | Nbk_13 | Nbk_14 | Nbk_15 |
| | 1<A≦2 | Nbk_21 | Nbk_22 | Nbk_23 | Nbk_24 | Nbk_25 |
| | 2<A≦3 | Nbk_31 | Nbk_32 | Nbk_33 | Nbk_34 | Nbk_35 |
| | 3<A≦4 | Nbk_41 | Nbk_42 | Nbk_43 | Nbk_44 | Nbk_45 |
| | 4<A≦5 | Nbk_51 | Nbk_52 | Nbk_53 | Nbk_54 | Nbk_55 |

|     | y=1 | y=2 | y=3 | y=4 | y=5 |
|-----|-----|-----|-----|-----|-----|
| x=1 | 1   | 2   | 2   | 3   | 5   |
| x=2 | 1   | 2   | 2   | 3   | 5   |
| x=3 | 2   | 3   | 3   | 4   | 5   |
| x=4 | 2   | 3   | 4   | 5   | 6   |
| x=5 | 3   | 4   | 5   | 6   | 7   |

FIG. 7A

Nbk_xy

|     | y=1 | y=2 | y=3 | y=4 | y=5 |
|-----|-----|-----|-----|-----|-----|
| x=1 | 1   | 2   | 3   | 4   | 5   |
| x=2 | 0   | 1   | 2   | 3   | 4   |
| x=3 | 0   | 0   | 1   | 2   | 3   |
| x=4 | 0   | 0   | 0   | 1   | 2   |
| x=5 | 0   | 0   | 0   | 0   | 1   |

FIG. 7B

H: DISPLAYED PIXEL NUMBER IN THE HORIZONTAL DIRECTION
V: DISPLAYED PIXEL NUMBER IN THE VERTICAL DIRECTION

LIQUID CRYSTAL DISPLAY APPARATUS AND PROGRAM USED FOR THE SAME

BACKGROUND OF THE INVENTION

1. Field of the Invention

The present invention relates to a liquid crystal display apparatus.

2. Description of the Related Art

U.S. Pat. No. 6,727,872 discloses an image processing method for reducing a potential difference corresponding to a gradation level (or value) between black and white in the adjacent pixel so as to reduce disclination, which means a liquid crystal molecular orientation failure.

In order to restrain the disclination using the method disclosed in U.S. Pat. No. 6,727,872 to a permissible level, an adjustment is required to gradually change potential differences of several to dozens of pixels on edges of an image and thus makes dull the edge of the image (or lowers the sharpness of the image). This problem is conspicuous in a liquid crystal display apparatus of a micro display type, such as a projection-type display apparatus, because its pixel size is small. In addition, there is a demand for preventing the discontinuous or uneven brightness in an image.

SUMMARY OF THE INVENTION

The prevent invention provides a liquid crystal display apparatus that can reduce disclination as well as restraining image quality deterioration.

A liquid crystal display apparatus configured to display an input image signal using a liquid crystal display element includes a feature amount generator configured to generate a feature amount based on the number of pixel pairs that satisfy a correspondence relationship between a gradation value of a target pixel and a gradation value of a surrounding pixel around the target pixel for an image represented by the input image signal, a processor configured to provide processing so as to set a correction value that reduces a dynamic range of a gradation value of the input image signal when the feature amount is larger than a first threshold, and so as not to set the correction value when the feature amount is equal to or smaller than the first threshold, and a liquid crystal driver configured to drive the liquid crystal display element based on the input image signal that has been corrected by the correction value.

Further features of the present invention will become apparent from the following description of exemplary embodiments with reference to the attached drawings.

BRIEF DESCRIPTION OF THE DRAWINGS

FIGS. 4A-4C are views for explaining an operation of the feature amount generating circuit illustrated in FIG. 3.

FIGS. 7A and 7B are correction value tables of S1103 illustrated in FIG. 6 according to the first, second, and third embodiments.

DESCRIPTION OF THE EMBODIMENTS

Figure 1:
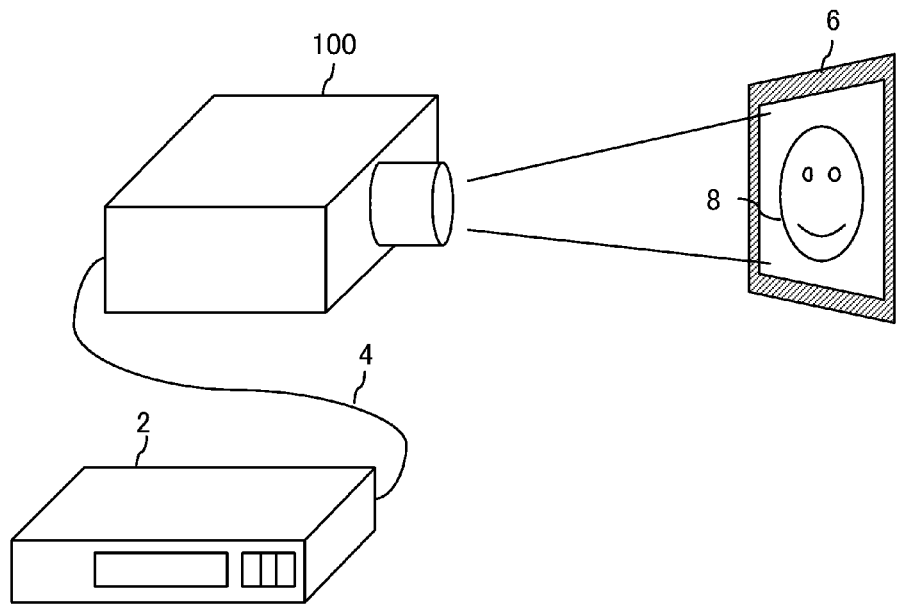
FIG. 1 is a perspective overview of a liquid crystal projector (liquid crystal display apparatus), to which the present invention is applicable.

FIG. 1 is a perspective overview of a liquid crystal projector 100 (liquid crystal display apparatus) configured to display an input image signal using a liquid crystal display element, to which the present invention is applicable. An image signal output from a video player 2 is input into the liquid crystal projector 100 through a video cable 4. The liquid crystal projector 100 is an image projecting apparatus configured to project, as a projected image 8, light modulated by a liquid crystal display element, such as a liquid crystal panel, in accordance with an input image signal, onto a screen 6 (a surface to be projected).

Figure 2:
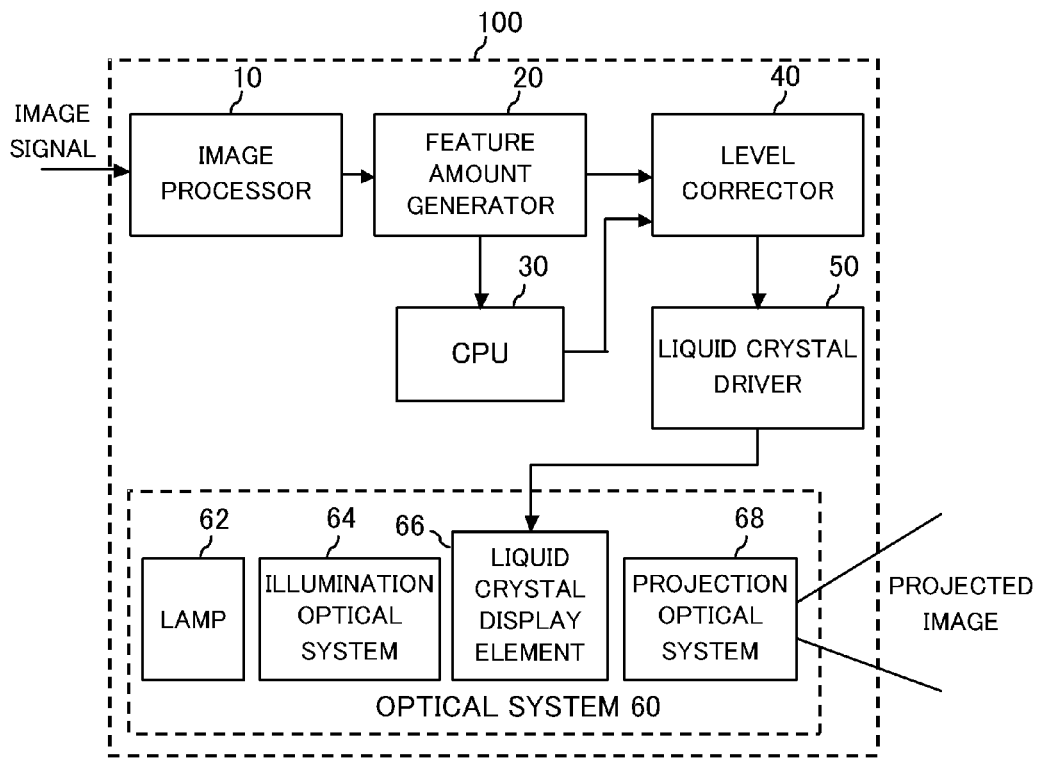
FIG. 2 is a block diagram of the liquid crystal projector illustrated in FIG. 1.

FIG. 2 is a block diagram of the liquid crystal display apparatus 100. The liquid crystal display apparatus 100 includes an image processor 10, a feature amount generator 20, a CPU 30, a level corrector 40, a liquid crystal driver 50, and an optical system 60.

The image processor 10 performs processing for an input image signal, such as a brightness correction, a contrast correction, a gamma correction, and a chromatic conversion.

The feature amount generator 20 is connected to the image processor 10, and generates a feature amount that numerically represents an incidence state of a disclination in the image signal output from the image processor 10.

Figure 3:
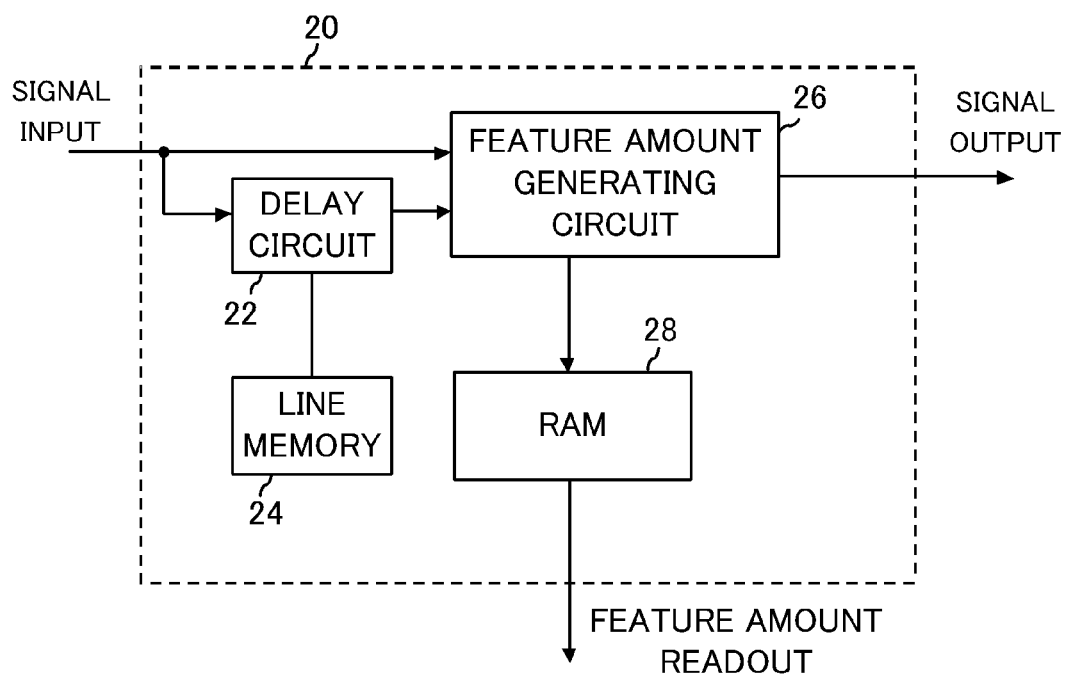
FIG. 3 is a block diagram of a feature amount generator illustrated in FIG. 2.

FIG. 3 is a block diagram of the feature amount generator 20. The feature amount generator 20 includes a delay circuit 22, a line memory 24, a feature amount generating circuit 26, and a random access memory ("RAM") 28.

The delay circuit 22 stores data of the input image signal into the line memory 24, delays it, and then reads it out. The line memory 24 stores data of the input image signal for maximum three horizontal lines. The delay circuit 22 reads gradation data for past two horizontal lines from the line memory 24, and inputs it into the feature amount generating circuit 26. The feature amount generating circuit 26 generates a feature amount, and stores it in the RAM 28. The feature amount stored in the RAM 28 contains information based on the number of pixel pairs that satisfy a correspondence relationship between a gradation value of a target pixel and a gradation value of a surrounding pixel around the target pixel. According to this embodiment, the feature amount is expressed in tables illustrated in FIGS. 4B and 4C.

Turning back to FIG. 2, the CPU 30 is connected to the feature amount generator 20 and the level corrector 40, and includes a memory (storage) (not illustrated) configured to store a correction value table illustrated in FIGS. 7A and 7B and a control method illustrated in FIG. 6, which will be described later. The CPU 30 is a microcomputer (processor) configured to read out a feature amount from the RAM 28 in the feature amount generator 20, to set the level correction amount (correction parameter) to the level corrector 40 in accordance with the feature amount, and to control a power or a condition of each component in the liquid crystal projector 100.

The level corrector 40 is connected to the feature amount generator 20 and the CPU 30. The level corrector 40 corrects a level in the image signal so as to reduce the disclination.

The liquid crystal driver 50 is connected to the level corrector 40, converts the image signal corrected by the level corrector 40 into a liquid crystal driving signal, and drives the liquid crystal display element 66 in the optical system 60.

The optical system 60 includes a lamp 62, an illumination optical system 64, a liquid crystal display element 66, and a projection optical system 68. The light emitted from the lamp 62 passes the illumination optical system 64, is modified by the liquid crystal display element 66, and is projected onto the screen 6 as the projected image 8 through the projection optical system (projection lens) 68. The liquid crystal display element 66 is connected to the liquid crystal driver 50, and modifies the incident light flux based on the liquid crystal driving signal from the liquid crystal driver 50.

First Embodiment

In the first embodiment, the CPU 30 commonly sets a disclination correcting amount to the overall image to the level corrector 40. FIG. 4A illustrates an arbitrary 3×3 pixel matrix in the image expressed by the image signal. FIG. 4B illustrates a table representative of a white-side feature amount (where "w" in Nw means white). FIG. 4C illustrates a table representative of a black-side feature amount (where "bk" in Nbk means black).

Since there are eight bits in this embodiment, a white's gradation level (gradation value) is 255, which corresponds to 8V. A black's gradation level is 0, which corresponds to 0V. The table representative of the white-side feature amount is a table used when the gradation value of the target pixel is close to 255. The table representative of the black-side feature amount is a table used when the gradation value of the target pixel is close to 0.

In the first embodiment, the feature amount generating circuit 26 compares the gradation value of the target pixel A illustrated in FIG. 4A with the gradation values of the surrounding pixels $B_1$ to $B_8$ around the target pixel A, and counts the number of feature amounts classified in matrices illustrated in FIGS. 4B and 4C.

There are eight surrounding pixels $B_1$ to $B_8$ in FIG. 4A, but one or more of pixels among these pixels $B_1$ to $B_8$ may be selected as a compared object according to the initial liquid crystal molecular orientation state and the driving mode. This embodiment sets two surrounding pixels $B_2$ and $B_5$ to the compared objects, and the feature amount is obtained by comparing the gradation values of these two surrounding pixels $B_2$ and $B_5$ with the gradation value of the target pixel.

Figure 10:
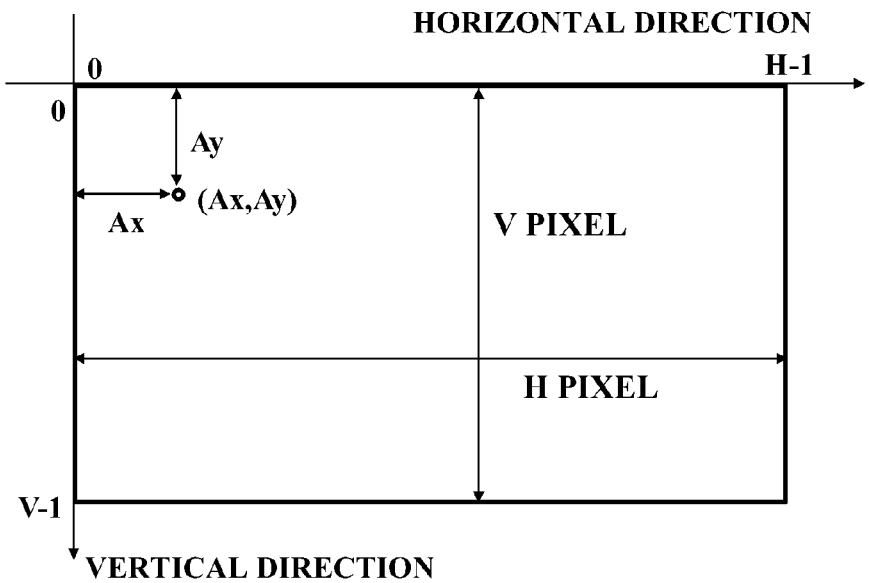
FIG. 10 is an explanatory view relating to a scan area when the feature amount generating circuit generates a feature amount.

FIG. 10 is an explanatory diagram relating to a scan area when the feature amount generator 20 generates a feature amount, and illustrates a relationship between a display area of the liquid crystal display element and a coordinate of the target pixel A. FIG. 10 illustrates the liquid crystal display element having a resolution comprised of H pixels in the horizontal direction and V pixels in the vertical direction. Herein, assume a coordinate system having an origin at the upper left corner pixel in the display area. The target pixel A is defined as a coordinate (Ax, Ay), which may be other than the outermost coordinates in the display area.

Figure 11:
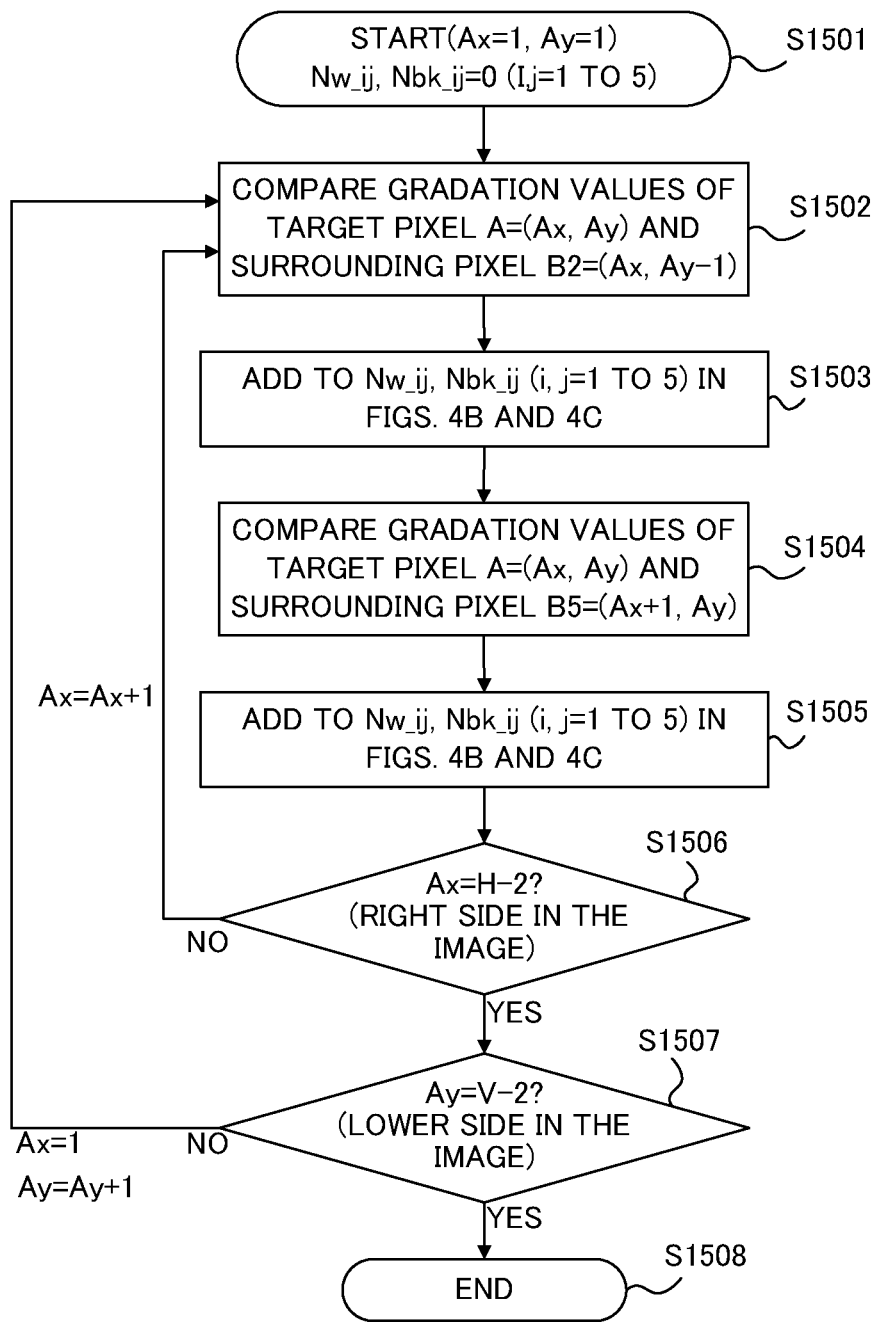
FIG. 11 is a flowchart of generating a feature amount.

FIG. 11 illustrates an operational flow of the feature amount generator 20.

S1501 is started with a trigger of a signal in synchronization with a frame of each input image. A first target pixel is set as (Ax, Ay)=(1, 1) which is retreated inside by one pixel each from the upper left corner pixel in the image.

In S1502, the gradation of the target pixel A is compared with that of $B_2$.

In S1503, when the conditions illustrated in FIGS. 4B and 4C are met, values made by adding 1 to the feature amounts Nw_ij and Nbk_ij that satisfy the condition are written down in the RAM 28 (where each of i and j is a natural number selected from 1 to 5).

Similar to S1502 and S1503, the qualified feature amounts are added in S1504 and S1505 after the gradation of the target pixel A is compared with that of $B_5$.

In S1506 and S1507, whether processing from S1502 to S1506 has been performed for the overall area for which the feature amount is generated.

A description will now be given of a calculative example of a specific feature amount. For instance, when the gradation value of the target pixel A is 215, the position is the uppermost row position in FIG. 4B, and when the gradation value of the surrounding pixel $B_2$ is 185, the feature amount generating circuit 26 adds 1 to the value of Nw_11. The feature amount generating circuit 26 adds 1 to the value of Nw_11 when the gradation value of the surrounding pixel $B_5$ is 185. The feature amount generating circuit 26 adds 1 to the value of Nw_12 when the gradation value of the surrounding pixel $B_5$ is 195. Another uncounted element, such as Nw_13, remains 0 in FIGS. 4B and 4C since nothing is added to it.

Similarly, the feature amount generating circuit 26 sequentially sets the target pixel A to each of all pixels in the image, produces data illustrated in FIGS. 4B and 4C in superimposed (added) states, and generates a feature amount of the disclination in the image signal. In other words, the feature amount generating circuit 26 generates the number of pixel pairs that satisfy the correspondence in the table, and the feature amount in this embodiment represents a relationship among the gradation value of the target pixel A and the gradation value of the surrounding pixel and the number of surrounding pixels.

This embodiment adopts two types of tables: One type is a table (matrix) illustrated in FIG. 4B which represents a combination between the white gradation (gradation 255) or almost white gradation and the intermediate gradation of the adjacent pixel level. The other type is a conditional matrix illustrated in FIG. 4C which represents a combination between the black gradation (gradation 0) or almost black gradation and the intermediate gradation of the adjacent pixel level. However, the classification of the condition is not limited to this embodiment. For example, the number of rows and the number of columns in the conditional matrix may be increased or three types or more of conditional matrices may be used.

Figure 5A:
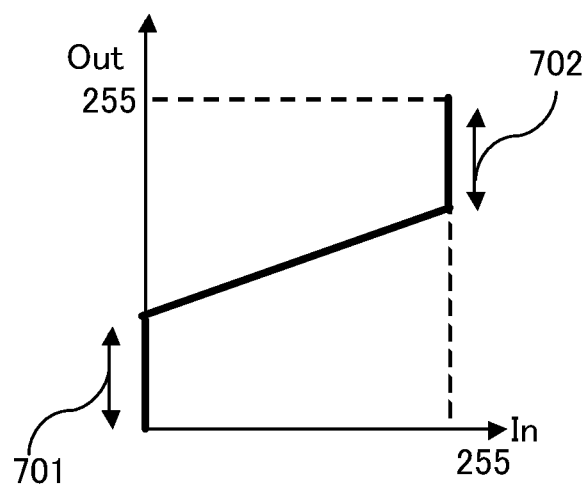
FIGS. 5A and 5B are graphs for explaining a correction characteristic of a gradation value performed by a level corrector illustrated in FIG. 2.

The level corrector 40 is a circuit having an input/output characteristic illustrated in FIG. 5A, and a blacks-side offset amount 701 and a white-side offset amount 702 are configured independently settable from the outside. The level corrector 40 reduces a dynamic range of the driving voltage of the liquid crystal display element 66. The abscissa axis in FIG. 5A denotes a gradation value of the input image, and its ordinate axis denotes a gradation value of the output image. The offset amounts 701 and 702 serve as correction amounts. The dynamic range is reduced by decreasing the maximum value of the driving voltage used to drive the liquid crystal or by increasing the minimum value or by the combination thereof. Reducing of the dynamic range of the driving voltage means reducing of the dynamic range of the gradation value in the input image signal.

Figure 5B:
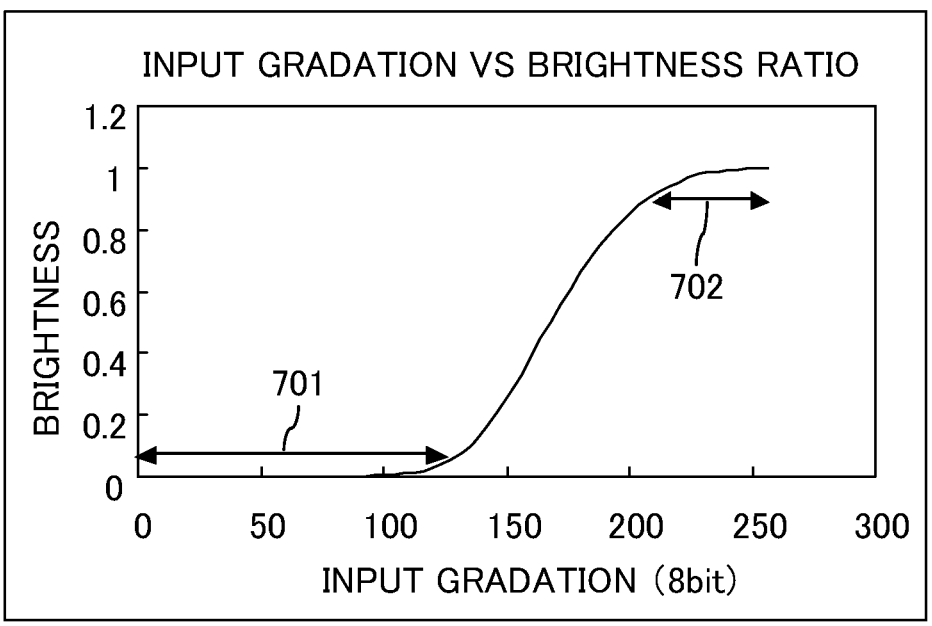

FIG. 5B is a graph illustrating a relationship between an input gradation value and display brightness in the general liquid crystal display element, and nonlinear characteristics can be seen near white (with brightness of 1) and near black (with brightness of 0) in which the brightness variation ratio to the input gradation is very small. Since the brightness variation of the displayed image is small, the influence upon the displayed image by the reduced dynamic range of the driving voltage is little recognized even when the dynamic range of the driving voltage is reduced by the black-side offset amount 701 and the white-side offset amount 702. In the meanwhile, although FIG. 5B illustrates the offset amounts 701, 702 are about 130 and 50, this embodiment sets the offset amount 701 to about 5 and the offset amount 702 to about 7.

The set values of the reducing offset amounts 701, 702 of the dynamic range of the driving voltage may be set based on the characteristic representative of the relationship between the input gradation and the brightness of the liquid crystal display element so that the black-side offset amount 701 can be larger than the white-side offset amount 702. This configuration can restrain the brightness variation and more effectively reduce the disclination.

Figure 6:
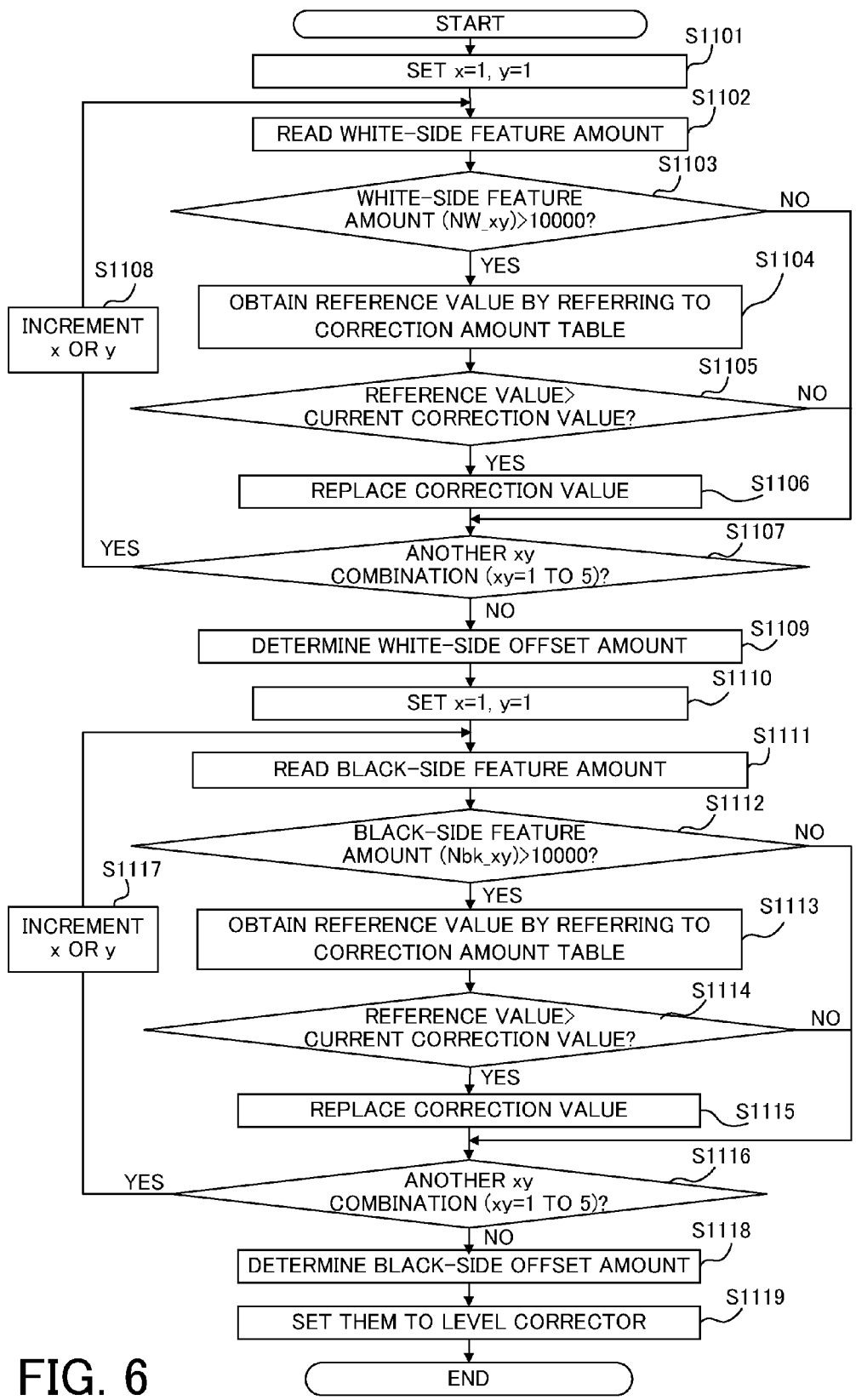
FIG. 6 is a flowchart for explaining an operation of a CPU illustrated in FIG. 2 according to first, second, and third embodiments.

FIG. 6 is a flowchart for explaining an operation of the CPU 30 according to the first embodiment, and "S" stands for a step. The flowchart illustrated in FIG. 6 is implemented as a computer executable program.

In the initial state, both of the offset amounts 701, 702 are set to 0, and stored in the memory (not illustrated). In other words, the correction value at the initial state is 0 and, in this case, the characteristic illustrated in FIG. 5A is a diagonal line of Out=In.

The CPU 30 first sets x=1 and y=1 (S1101), and reads the feature amounts illustrated in FIGS. 4B and 4C from the RAM 28 (S1102). Next, the CPU 30 determines whether the value of the white-side feature amount (Nw_11) illustrated in FIG. 4B is larger than or equal to or smaller than a first threshold 10,000 (S1103).

When the CPU 30 determines that the number of white-side feature amounts (Nw_11) is larger than the threshold of 10,000, the CPU 30 obtains a reference value by referring to the correction value table illustrated in FIGS. 7A and 7B (S1104). FIG. 7A is a table for the white-side correction value corresponding to the offset amount 702 illustrated in FIGS. 5A and 5B, and FIG. 7B is a table for the black-side correction corresponding to the offset amount 701 illustrated in FIGS. 5A and 5B. Since the correction value (offset amount) corresponding to Nw_11 is 1, the CPU 30 obtains this as a reference value.

Next, the CPU 30 determines whether the reference value is larger than the current correction value (S1105), and if so replaces the current value (S1106). As discussed above, in the initial state, the correction value is 0, and the reference value of 1 is larger. Thus, the CPU 30 sets and stores in the memory (not illustrated) the reference value of 1 as a current correction value.

After NO of S1103, NO of S1105 or S1106, the CPU 30 determines whether there is another non-investigated combination of x and y (where x=1 to 5 and y=1 to 5) (S1107). When there is another x and y combination, x or y is incremented (S1108) and the flow returns to S1102.

For example, when the CPU 30 determines the white-side feature amount (Nw_12) is larger than the first threshold 10,000 (S1103), the CPU 30 refers to the correction table illustrated in FIG. 7A and obtains the reference value 2 corresponding to Nw_12 (S1104). Then, the CPU 30 determines whether the reference value 2 is larger than the current correction value 1 (S1105), and since it is larger than the current correction value 1, the CPU 30 replaces it with the correction value 2 (S1106).

When the CPU 30 determines that it has obtained feature amounts for all combinations of x and y (S1107), the CPU 30 determines the white-side offset amount 702 (S1109). Herein, the maximum correction value is set for all the combinations of x and y, and this becomes the white-side offset amount 702.

The CPU 30 performs a similar flow for the black-side feature amount (Nbk_xy) so to as determine the black-side correction amount, and determines the black-side offset amount 701 (S1110 to S1118). Finally, the CPU 30 sets the determined correction amounts (offset amounts 701, 702) to the level corrector 40 (S1119).

The conventional process sets the correction value only for an edge of an image in which the disclination occurs rather than for the entire image, and an image deterioration problem occurs, such as reduced sharpness.

On the other hand, in this embodiment, the CPU 30 performs processing for the entire image so as to set a correction value that reduces the dynamic range of the gradation value of the input image signal when the feature amount is larger than the first threshold, and so as not to set the correction value when the feature amount is equal to or smaller than the first threshold. Therefore, the image deterioration can be reduced.

This embodiment can display an image in which the disclination is reduced without discontinuing a gradation value at an edge of an image (therefore without damaging the sharpness). Of course, an area of the image processing may be set to a rectangular shape having one hundred pixels or more in one side.

The CPU 30 may performs weighing based on image correcting priority by differently setting the thresholds of S1103 and S1112 in accordance with feature amount indices x and y. In addition, while S1105 and S1114 adopt the maximum correction value, these values may be weighed in accordance with the feature amount indices x and y.

The feature amount generating circuit 26 generates the feature amount by counting the number of pixel pairs that satisfy the combination of the table illustrated in FIGS. 4B and 4C, the method of generating the feature amount is limited to this embodiment. For example, the feature amount may be set to a value of an evaluation function that uses, as a variable, the existence of the pixel that satisfies the combinational condition of the table illustrated in FIG. 4B or 4C.

Second Embodiment

The second embodiment divides the image into a plurality of rectangular areas, and commonly sets the correction amount of the disclination to each area to the level corrector 40. While the second embodiment thus divides the display image into a plurality of areas, one side of each area may be 100 pixels or more so as to maintain the sharpness.

The apparatus structure applied to the second embodiment is similar to that illustrated in FIGS. 1 to 3 of the first embodiment. In addition, in the second embodiment, the feature amount illustrated in FIGS. 4B and 4C are generated for each area. The flow performed by CPU 30 is similar to that illustrated in FIG. 6. Nevertheless, the offset amounts 701, 702 set in S1109 and S1118 is the offset amount for the entire image in the first embodiment, whereas they are set for each area in the second embodiment.

This embodiment changes the dynamic range of the gradation value for each section having 100 pixels or more, and can display an image in which the sharpness is maintained to some extent and the disclination is reduced.

Third Embodiment

The third embodiment is similar to the second embodiment in that the image is divided into a plurality of areas, each of which has 100 pixels in one side. However, in the second embodiment, the discontinuous brightness may occur at the boundary between an area in which the disclination is corrected and an area in which the disclination is not corrected. Therefore, the third embodiment is different from the second embodiment in that the third embodiment performs image processing so as to provide a smoothly continuous change of the brightness.

Figure 8A:
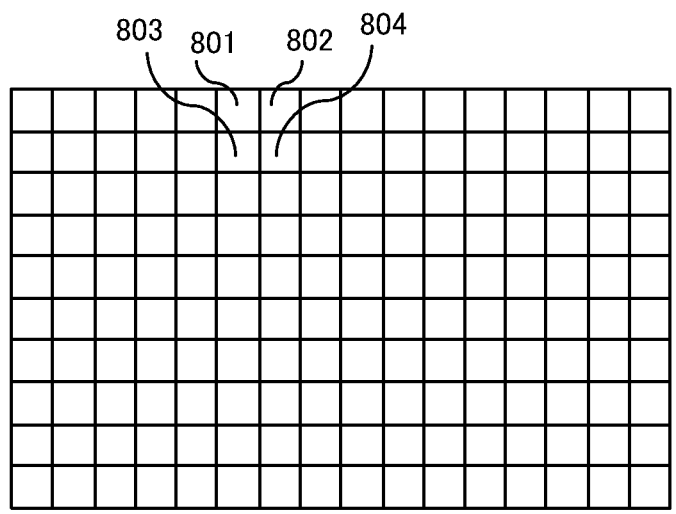
FIGS. 8A and 8B are views for explaining image processing according to the third embodiment.

According to third embodiment, as illustrated in FIG. 8A, the displayed area is divided into a plurality of (16×10) areas, but the CPU 30 does not commonly set a disclination correcting amount to each area, to the level corrector 40.

The apparatus structure applied to the third embodiment is similar to that illustrated in FIGS. 1 to 3 in the first embodiment. In addition, in the third embodiment, the feature amount illustrated in FIGS. 4B and 4C is generated for each area. The flow performed by the CPU 30 is similar to that illustrated in FIG. 6. Nevertheless, in the first embodiment, the offset amounts 701 and 702 set in S1109 and S1118 are offset amounts for the entire image, whereas they are set for the central coordinate of each area in the third embodiment.

Figure 8B:
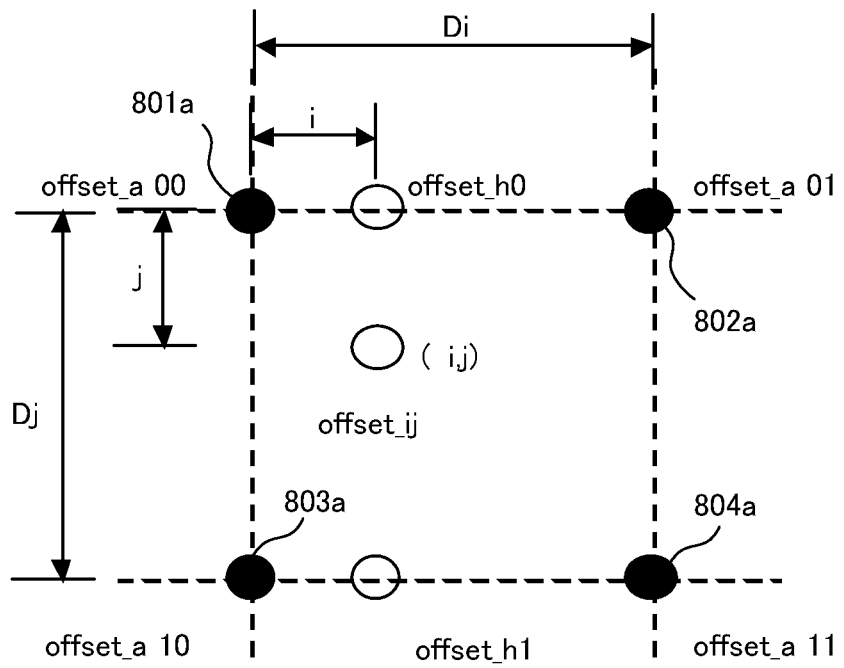

In other words, according to the third embodiment, the offset amount for the central coordinate of each area is set by the flow of illustrated in FIG. 6, and another offset of the coordinate is set as illustrated in FIG. 8B.

In FIG. 8B, 801a to 804a denote central coordinates of areas 801 to 804 illustrated in FIG. 8A. offset_a00 is a correction amount that contains information of the offset amounts 701, 702 set for the central coordinate 801a of the area 801 in the flow illustrated in FIG. 6. offset_a01 is a correction amount that contains information of the offset amounts 701, 702 set for the central coordinate 802a of the area 802 in the flow illustrated in FIG. 6. offset_a10 is a correction amount that contains information of the offset amounts 701, 702 set for the central coordinate 803a of the area 803 in the flow illustrated in FIG. 6. offset_a11 is a correction amount that contains information of the offset amounts 701, 702 set for the central coordinate 804a of the area 804 in the flow illustrated in FIG. 6.

At this time, an offset of an arbitrary coordinate (i,j) is found from the following expressions: When the offset amount is not a positive number, the CPU 30 of this embodiment converts the offset amount into a positive value by rounding. Next, the CPU 30 sets the offset amount obtained for each coordinate, to the level corrector 40:

$$\text{offset\_h0} = \text{offset\_a00} + \frac{i}{Di}(\text{offset\_a01} - \text{offset\_a00}) \quad \text{Expression 1}$$

$$\text{offset\_h1} = \text{offset\_a10} + \frac{i}{Di}(\text{offset\_a11} - \text{offset\_a10}) \quad \text{Expression 2}$$

$$\text{offset\_ij} = \text{offset\_h0} + \frac{j}{Dj}(\text{offset\_ah1} - \text{offset\_h1}) \quad \text{Expression 3}$$

Herein, "i" denotes a distance in the horizontal direction and "j" denotes a distance in the vertical direction from a central coordinate of a certain area to a coordinate at an arbitrary position. Dx denotes a distance in the horizontal direction and Dy denotes a distance in the vertical direction between adjacent areas. offset_a** denotes a correction value of a central coordinate of a certain area. offset_h* denotes a value found through the interpolation calculation in the horizontal direction. offset_ij is a correction amount at an arbitrary coordinate determined by the interpolation calculation.

This embodiment also performs processing that sets a correction value for the entire image, and can display an image in which the disclination is reduced and the sharpness is maintained to some extent, instead of processing only for the edge of the image. In addition, this embodiment can obtain a natural image in which the level correction amount is smoothly connected through interpolations between the adjacent areas.

While this embodiment utilizes an interpolation operating means, another means may be used as long as an image generating means that does not cause the brightness discontinuity between areas. As a result of an investigation of the visual confirmation, the effect of this embodiment can be expected in the corrected image when the discontinuous brightness change generated associated with the image correction falls within 5% or 2% or 1% of the displayed maximum brightness.

Fourth Embodiment

The fourth embodiment is similar to the second and third embodiments in that the image is divided into a plurality of rectangular areas, each of which has one hundred pixels or more in one side. Even the image processing of the third embodiment may cause non-uniform brightness at the boundary between the area in which the disclination is corrected and the area in which the disclination is not corrected. Accordingly, the fourth embodiment performs image processing that corrects an area that does not require a correction of the disclination, so as to reduce the correctional difference from the area in which the disclination is corrected and to make the correctional difference unrecognized.

The apparatus structure applied to the fourth embodiment is similar to that illustrated in FIGS. 1 to 3 of the first embodiment. In addition, in the fourth embodiment, the feature amount illustrated in FIGS. 4B and 4C are generated for each area. The flow performed by CPU 30 is similar to that illustrated in FIG. 6. Nevertheless, the offset amounts 701, 702 set in S1109 and S1118 are the offset amounts set to the central coordinate of each area similar to the third embodiment.

In the fourth embodiment, similar to the third embodiment, the display image is divided into a plurality of areas, but the CPU 30 does not commonly set the disclination correcting amount to each area to the level corrector 40.

Figure 9:
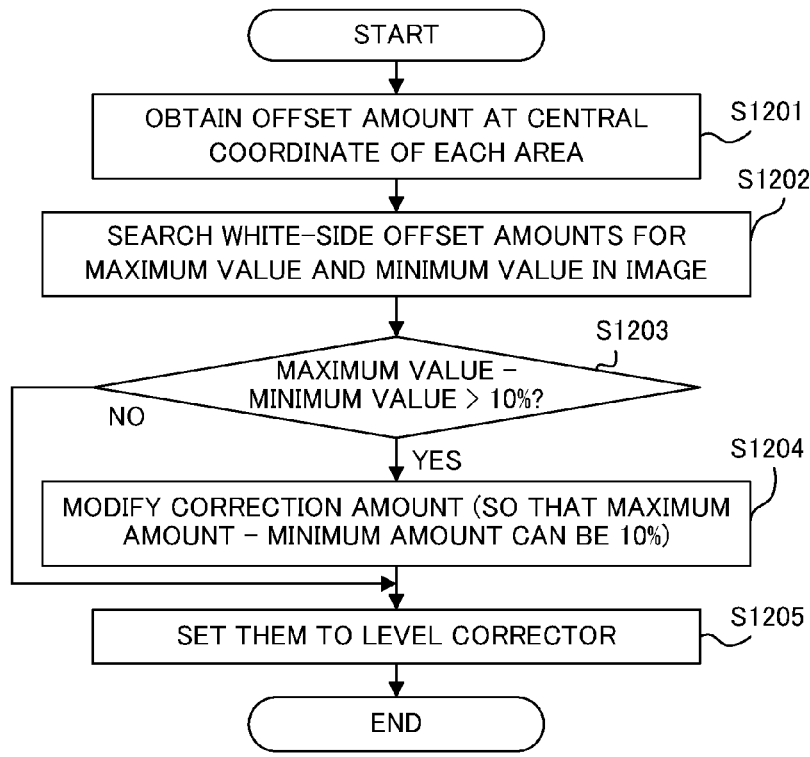
FIG. 9 is a flowchart for explaining another operation of the CPU illustrated in FIG. 2 according to a fourth embodiment.

FIG. 9 is a flowchart for explaining an operation of the CPU 30 according to the fourth embodiment, and "S" stands for a step. The flowchart illustrated in FIG. 9 is implemented as a computer executable program.

Initially, similar to the third embodiment, the CPU 30 obtains an offset amount for the central coordinate of each area as described in the third embodiment using the flow illustrated in FIG. 6 (S1201). This embodiment is different from the third embodiment in that an obtained offset is a provisional offset amount in the fourth embodiment. In addition, the CPU 30 does not perform S1119 illustrated in FIG. 6.

Next, the CPU 30 searches the white-side offset amount 702 of the central coordinate of the entire area in the image for the maximum value and the minimum value (S1202), and determines whether a difference between the brightness corresponding to the maximum value and the brightness corresponding to the minimum value is larger than a second threshold 0.1 (10%) (S1203).

The second threshold of S1203 is not limited, and can be arbitrarily set. When the brightness difference between areas falls within 10%, 7%, or 5%, the uneven brightness is unlikely to stand out and the threshold in S1203 may be set so that the brightness difference cannot exceed one of the above values.

When determining that a difference between the maximum value and minimum value is larger than 10%, the CPU 30 modifies at least one of the maximum value and the minimum value because the correction amount difference between the areas is excessively large and the uneven brightness may be caused in the corrected image (S1204).

In case of No of S1203 or after S1204, the CPU 30 sets the offset amount to the level corrector 40 (S1205). S1205 corresponds to S1119. Thereafter, the offset amount at the coordinate other than the central coordinate of each area is set using Expressions 1 to 3 and the offset amount modified in S1204.

This embodiment performs processing that sets the correction value for the entire image instead of performing processing only for the edge of the image, and can also display an image in which the disclination is reduced and the sharpness is maintained to some extent. In addition, this embodiment can obtain a natural image in which the level correction amount is smoothly connected through interpolations between the adjacent areas. Moreover, this embodiment can provide a high-quality image with little uneven brightness.

This embodiment corrects the white-side offset amount 702 in which the uneven correction can be relatively visually recognized, but the black-side offset amount 701 may be similarly corrected.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2011-065099, filed Mar. 24, 2011, which is hereby incorporated by reference herein in its entirety.

What is claimed is:

1. A liquid crystal display apparatus configured to display an input image signal using a liquid crystal display element, the liquid crystal display apparatus comprising:
   a feature amount generator configured to generate a feature amount of an entire area that includes a plurality of pixels, by sequentially setting a target pixel to each of the plurality of pixels, by obtaining information of the number of pixel pairs that satisfy a correspondence relationship between a gradation value of the target pixel and a gradation value of a surrounding pixel around the target pixel at each position of the target pixel, and by superimposing the number of pixel pairs, for an image represented by the input image signal;
   a processor configured to provide processing for the entire image so as to set a correction value that reduces a dynamic range of a gradation value of the input image signal when the feature amount is larger than a first threshold, and so as not to set the correction value when the feature amount is equal to or smaller than the first threshold; and
   a liquid crystal driver configured to drive the liquid crystal display element based on the input image signal that has been corrected by the correction value.

2. The liquid crystal display apparatus according to claim 1, wherein the feature amount generator sequentially sets the target pixel to each of all pixels in the image, and generates a feature amount of an overall image, and
   wherein the processor sets the correction value for the overall image.

3. The liquid crystal display apparatus according to claim 1, wherein the image includes a plurality of rectangular area, each of which includes 100 pixels or more in one side,
   wherein the feature amount generator generates a feature amount for each area by sequentially setting the target pixel for each of all pixels in each area, and
   wherein the processor sets the correction value for each area.

4. The liquid crystal display apparatus according to claim 1, wherein the image includes a plurality of rectangular area, each of which includes 100 pixels or more on one side,
   wherein the feature amount generator generates a feature amount for each area by sequentially setting the target pixel for each of all pixels in each area, and
   wherein the processor sets the correction amount corresponding to the feature amount of each area for a central coordinate of each area, and sets a correction amount at a coordinate other than the central coordinate of each area through an interpolation and the correction amount of the central coordinate of each area.

5. The liquid crystal display apparatus according to claim 4, wherein the processor modifies at least one of a maximum value and a minimum value of the correction values of the central coordinates so that the a difference between the maximum value and the minimum value of the correction values of the central coordinates in the image can be smaller than a second threshold, and
   wherein the processor sets the correction amount of the coordinate other than the central coordinate using the interpolation and a modified correction amount of the central coordinate.

6. The liquid crystal display apparatus according to claim 1, wherein the feature amount generator generates a plurality of feature amounts in accordance with a plurality of gradation value ranges of the target pixel and a plurality of gradation value ranges of the surrounding pixel, and
   wherein the processor modifies the first threshold in accordance with the gradation value ranges of the surrounding pixel.

7. A non-transitory computer-readable storage medium storing a program that enables a computer to execute a method for displaying an input image signal on a display apparatus using a liquid crystal display element, the method comprising:
   a feature amount generating step of generating a feature amount of an entire area that includes a plurality of pixels, by sequentially setting a target pixel to each of the plurality of pixels, by obtaining information of the number of pixel pairs that satisfy a correspondence relationship between a gradation value of the target pixel and a gradation value of a surrounding pixel around the target pixel at each position of the target pixel, and by superimposing the number of pixel pairs, for an image represented by the input image signal;
   a processing step of providing processing for the entire image so as to set a correction value that reduces a dynamic range of a gradation value of the input image signal when the feature amount is larger than a first threshold, and so as not to set the correction value when the feature amount is equal to or smaller than the first threshold; and
   a liquid crystal driving step of driving the liquid crystal display element based on the input image signal that has been corrected by the correction value.

* * * * *